(12) United States Patent
Lindemann et al.

(10) Patent No.: US 8,531,326 B2
(45) Date of Patent: Sep. 10, 2013

(54) METHOD AND APPARATUS FOR PULSE WIDTH MODULATION SIGNAL PROCESSING

(75) Inventors: Stig Lindemann, Aarhus N (DK); Mads Kolding Nielsen, Hovedgaard (DK)

(73) Assignee: Micro Motion, Inc., Boulder, CO (US)

( * ) Notice: Subject to any disclaimer, the term of this patent is extended or adjusted under 35 U.S.C. 154(b) by 134 days.

(21) Appl. No.: 13/003,822

(22) PCT Filed: Jul. 30, 2008

(86) PCT No.: PCT/US2008/071564
§ 371 (c)(1),
(2), (4) Date: Jan. 12, 2011

(87) PCT Pub. No.: WO2010/014085
PCT Pub. Date: Feb. 4, 2010

(65) Prior Publication Data
US 2011/0115657 A1 May 19, 2011

(51) Int. Cl.
*H03M 1/12* (2006.01)
(52) U.S. Cl.
USPC .......................................... 341/155; 375/238
(58) Field of Classification Search
USPC ................. 341/144, 145, 143, 110, 155, 157; 375/353, 295, 238
See application file for complete search history.

(56) References Cited

U.S. PATENT DOCUMENTS

| | | | |
|---|---|---|---|
| 3,794,841 A | 2/1974 | Cosentino et al. | |
| 5,287,107 A | 2/1994 | Gampell et al. | |
| 5,434,694 A * | 7/1995 | Saito et al. | 398/191 |
| 5,875,235 A * | 2/1999 | Mohajeri | 379/93.36 |
| 5,949,225 A | 9/1999 | Sawtell | |
| 6,430,229 B1 * | 8/2002 | Scott et al. | 375/285 |
| 6,535,564 B1 * | 3/2003 | Mandyam | 375/353 |
| 7,369,067 B2 | 5/2008 | Kishi et al. | |
| 8,217,820 B2 * | 7/2012 | Chen | 341/152 |
| 2012/0025910 A1 * | 2/2012 | Jiang et al. | 330/251 |
| 2012/0068614 A1 * | 3/2012 | Ng et al. | 315/185 R |

FOREIGN PATENT DOCUMENTS

| | | |
|---|---|---|
| EP | 0863624 A2 | 9/1998 |
| JP | 63121309 A | 5/1988 |
| JP | 05282586 A | 10/1993 |
| RU | 2000658 C1 | 9/1993 |
| RU | 2248665 C2 | 3/2005 |
| RU | 914489 U1 | 2/2010 |
| WO | 9833285 A1 | 7/1998 |
| WO | 0077301 A2 | 2/2000 |

OTHER PUBLICATIONS

Yoshikatsu Sakai, et al., "Field Interface of CENTUM-XL", Yokogawa Technical Report, vol. 32, No. 4, pp. 235-240, Oct. 10, 1988, Japan.

* cited by examiner

*Primary Examiner* — Peguy Jean Pierre
(74) *Attorney, Agent, or Firm* — The Ollila Law Group LLC

(57) ABSTRACT

A signal processor (30) is provided. The signal processor (30) is configured to receive a first analog signal and convert the first analog signal into a digital signal. The digital signal is transmitted across an electrical barrier and converted into a scaled pulse width modulation signal. The scaled pulse width modulation signal is then converted into a scaled second analog signal, which is output by the signal processor (30).

15 Claims, 4 Drawing Sheets

METHOD AND APPARATUS FOR PULSE WIDTH MODULATION SIGNAL PROCESSING

TECHNICAL FIELD

The present invention relates to a signal processor, and more particularly, to a signal processor with a scaled analog signal.

BACKGROUND OF THE INVENTION

Certain electrical circuits require data transmission between electrical instruments that are electrically isolated from one another. One example is when electrical instruments are coupled to a bus loop. Because bus loops provide communication between electrical instruments in addition to power, a problem can exist if the signal encoding schemes between the electrical instrument and the bus loop are not substantially the same. Electrical instruments utilizing bus loops, such as a two-wire bus loop receive power and communicate through the bus loop using analog signals by controlling either the voltage or current draw. This first analog signal is then converted into a digital signal, processed, converted back into a second analog signal, and transmitted to another instrument or a host system. This method of communicating is adequate so long as the first and second signals are based on the same scale. Typically, in a two-wire bus loop, the instrument varies the current between approximately 4-20 mA, where 4 mA corresponds to a minimum value and 20 mA corresponds to a maximum value. A problem can arise however, if one of the electrical instruments is operating on a different current range, for example if the analog signal is limited to between approximately 12-20 mA. Using this current range, 12 mA would correspond to a minimum value and 20 mA would correspond to a maximum value. An error may occur if the analog signal received from the electrical instrument operating on a 12-20 mA scale is sent to an electrical instrument operating on a 4-20 mA scale.

This error can be compounded in situations where the instruments are electrically isolated from one another. Although there are various configurations capable of such data transmission, one common configuration utilizes optically coupled circuits. Typically, one instrument of the optically coupled circuit generates a first analog data signal, which is converted to a digital signal using an analog-to-digital converter. The digital signal may comprise a serial bit stream value, which is transmitted using an optocoupler.

One problem with prior art optically coupled circuits is that they are limited in their ability to scale the first signal to accommodate instruments utilizing different signaling. In other words, the transmitted signal generally corresponds to the first analog signal encoding and not to the second analog signal encoding. This may be acceptable in limited situations; however, it may be desirable to scale the first signal to accommodate a different signal process. For example, if one of the instruments is optically coupled to a bus loop that operates on a scale different from the instrument itself, it may be necessary to scale the first signal to correspond to the second signal. The scaling may comprise any manner of linear or non-linear scaling to the signal such that the signal changes to accommodate the output analog signal encoding corresponding to another electrical instrument. Therefore, the prior art limits the first signals available to the instrument and therefore, limits the capabilities of the electrical instrument.

The present invention overcomes this and other problems and an advance in the art is achieved by performing runtime scaling of the bit-stream in order to provide an accurate second signal in situations where the first signaling does not substantially match the second signaling.

ASPECTS

According to an aspect of the invention, a signal processor is configured to:
receive a first analog signal;
convert the first analog signal into a digital signal;
transmit the digital signal across an electrical barrier;
generate a scaled pulse width modulation signal based on the digital signal; and
convert the scaled pulse width modulation signal into a second analog signal.

Preferably, the electrical barrier comprises an optocoupler.

Preferably, the signal processor is further configured to scale the pulse width modulation signal based on a difference between a first analog signal encoding utilized by a bus instrument coupled to an input of the signal processor and a second analog signal encoding utilized by a bus loop coupled to an output of the signal processor.

Preferably, the digital signal comprises a serial bit stream.

According to another aspect of the invention, a bus loop system including a bus instrument electrically isolated from a bus loop with a signal processor comprises:
an analog-to-digital converter adapted to convert a first analog signal received by the bus instrument into a digital signal;
a signal transmitter adapted to transmit the digital signal to a signal scaler;
wherein the signal scaler is adapted to convert the digital signal into a scaled pulse width modulation signal and convert the scaled pulse width modulation signal into a scaled second analog signal.

Preferably, the signal transmitter comprises an optocoupler adapted to electrically isolate the bus instrument from the bus loop.

Preferably, a first analog signal encoding is different from a second analog signal encoding.

According to another aspect of the invention, a signal processor is configured to: receive a first analog signal;
convert the first analog signal into a digital signal;
generate a pulse width modulation signal based on the digital signal;
transmit the pulse width modulation signal across an electrical barrier; and
convert the pulse width modulation signal into a scaled second analog signal.

Preferably, the signal processor is further configured to scale the digital signal based on a difference between a first analog signal encoding utilized by a bus instrument coupled to an input of the signal processor and a second analog signal encoding utilized by a bus loop coupled to an output of the signal processor.

According to another aspect of the invention, a method for transmitting signals from an analog signal generator to an analog signal receiver, comprising the steps of:
generating a first analog signal;
converting the first analog signal into a digital signal;
transmitting the digital signal across an electrical barrier;
generating a scaled pulse width modulation signal based on the digital signal; and
converting the scaled pulse width modulation signal into a scaled second analog signal.

Preferably, the method further comprises using an optocoupler to transmit the digital signal.

Preferably, the scaled second analog signal is based on a difference between a first analog signal encoding utilized by the analog signal generator and a second analog signal encoding utilized by the analog signal receiver.

According to another aspect of the invention, a method for transmitting signals from an analog signal generator to an analog signal receiver, comprising the steps of:

receiving a first analog signal;

converting the first analog signal into a digital signal;

generating a pulse width modulation signal based on the digital signal;

transmitting the pulse width modulation signal across an electrical barrier; and converting the pulse width modulation signal into a scaled second analog signal.

Preferably, the method further comprises using an optocoupler to transmit the digital signal.

Preferably, the scaled second analog signal is based on a difference between a first analog signal encoding utilized by the analog signal generator and a second analog signal encoding utilized by the analog signal receiver.

DETAILED DESCRIPTION OF THE INVENTION

FIGS. 1-4 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
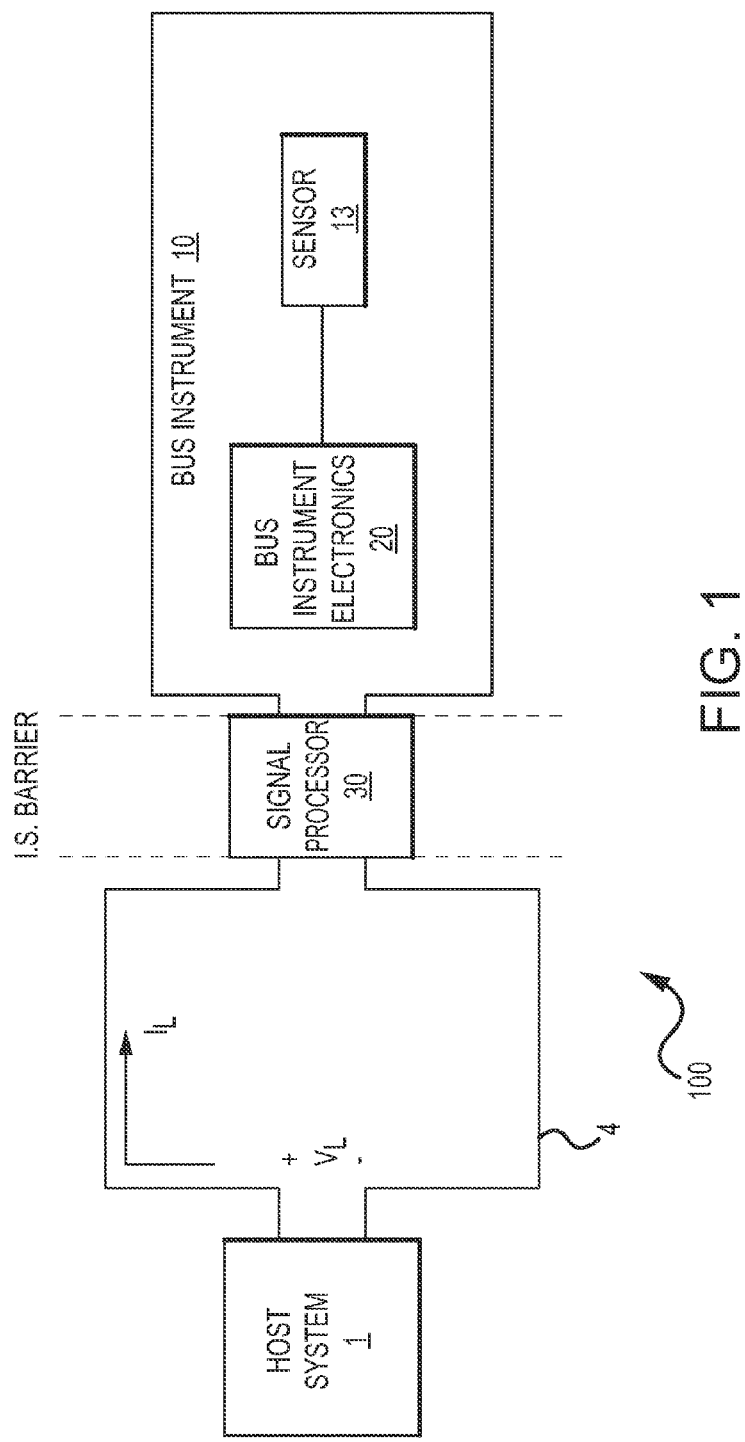
FIG. 1 shows a bus loop system according to an embodiment of the invention.

FIG. 1 shows a bus loop system 100 according to an embodiment of the invention. The bus loop 100 includes a host system 1, a bus loop 4, a bus instrument 10, and a signal processor 30 coupling the bus instrument 10 to the bus loop 4. The host system 1 generates a loop voltage $V_L$ and a loop current $I_L$ over the bus loop 4. The host system 1 may comprise a central control unit, a CPU, or some other processing system used to process the signals received over the bus loop 4. According to one embodiment of the invention, the bus loop 4 comprises a two-wire bus loop 4. However, it should be understood that the bus loop 4 does not have to comprise a two-wire bus loop.

The bus instrument 10 can include any manner of sensor or meter, such as a flow meter. In embodiments where the bus instrument 10 includes a flow meter, the flow meter may comprise a vibratory flow meter, such as a Coriolis flow meter or a densitometer. As shown in FIG. 1, the bus instrument 10 includes a sensor 13 and bus instrument electronics 20. The bus instrument electronics 20 may comprise any manner of CPU, processing system, or micro-processing system. According to an embodiment of the invention, the sensor 13 is configured to generate first analog signals and input the first analog signals to the bus instrument electronics 20. The bus instrument electronics 20 can generate second analog signals that are in the form of a variable loop current $I_L$ flowing in the bus loop 4. The bus instrument 10 can be configured to draw a predetermined or limited amount of power when in use with the two-wire bus 4. Because of the measurement communication protocol and the power limitations built into the bus loop system 100, the bus instrument 10 may be isolated from the two-wire bus loop 4 using a signal processor 30. In some embodiments, the signal processor 30 can comprise an intrinsically safe (I.S.) barrier (dashed line).

The isolation limits the electrical power that the bus instrument 10 can draw from the two-wire bus loop 4 and the host system 1. The isolation prevents damage to the two-wire bus loop 4 and the host system 1 upon the event of catastrophic failure of the bus instrument 10. In addition, the isolation limits electrical power transfer through the I.S. barrier in order to eliminate an explosion hazard and prevent ignition of any explosive or flammable materials in the environment of the bus instrument 10.

Figure 2:
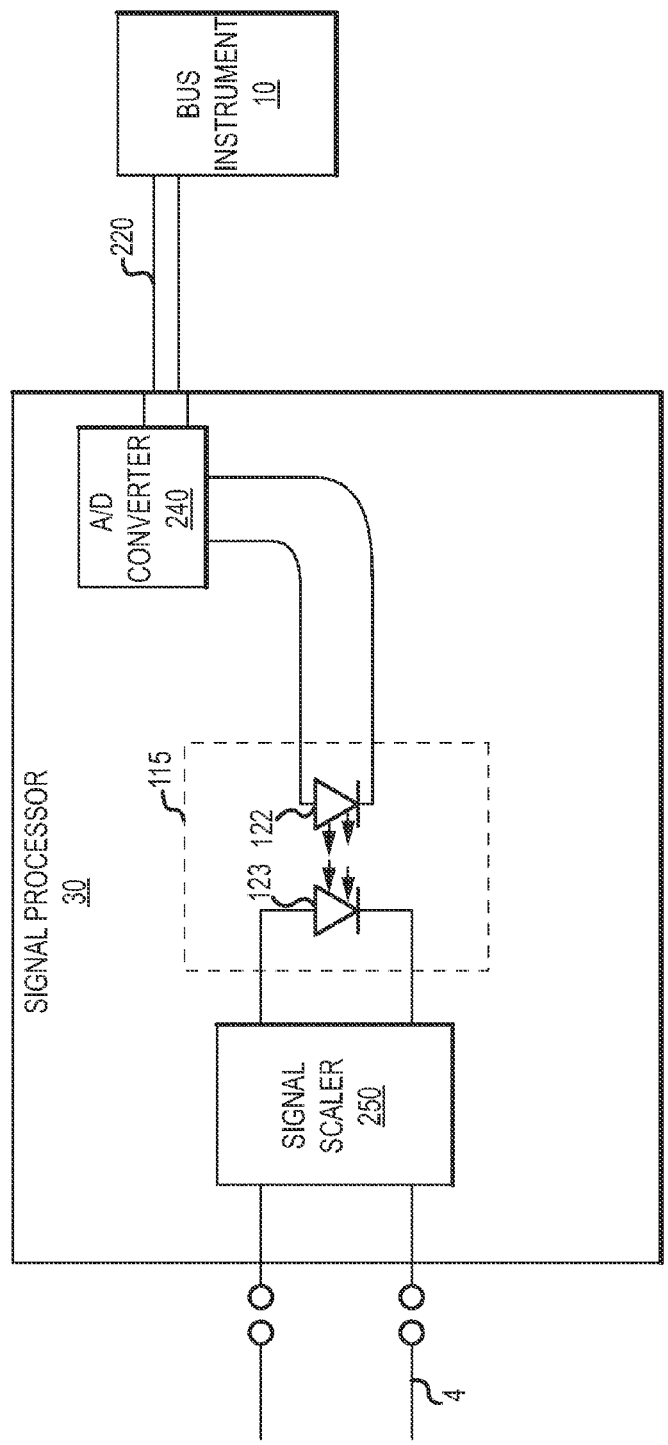
FIG. 2 shows a signal processor according to an embodiment of the invention.

FIG. 2 shows greater details of an isolation feature of the signal processor 30. The signal processor is shown as receiving a first analog signal from the bus instrument 10. However, it should be understood that the first analog signal does not have to originate from the bus instrument 10, but rather, the signal processor 30 may be utilized in other environments where analog signal processing is required. The analog signal received from bus instrument 10 over leads 220 are received by an analog to digital converter 240 where the signals are digitized. According to one embodiment of the invention, the analog-to-digital converter 240 comprises a delta sigma converter, which converts the analog signal into a serial bit stream. However, it should be understood that other analog-to-digital converters may be used and the particular analog-to-digital converter used should not limit the scope of the invention.

According to an embodiment of the invention, the signal processor 30 includes an optocoupler 115 that is connected between the two-wire bus loop 4 and the analog-to-digital converter 240. The optocoupler 115 may also be referred to as an opto-isolator, optical coupler, or photocoupler. The optocoupler 115 electrically isolates the bus instrument 10 from the host system 1. Consequently, the bus instrument 10 cannot short out the two-wire bus loop 4. Furthermore, catastrophic failure of the bus instrument 10 cannot draw excessive current from the host system 1. The optocoupler 115 comprises a transmitter light source 122 and a receiver light source 123. The transmitter and receiver light sources 122, 123 can comprise any manner of light-reactive electronic components, including laser transmitter and receiver light sources, LED transmitter and receiver light sources, LED laser transmitter and receiver light sources, etc.

The transmitter light source 122 and the receiver light source 123 are commonly formed adjacent to each other wherein light generated by the transmitter light source 122 is directly received by the receiver light source 123. In other embodiments, the transmitter light source 122 and the receiver light source 123 are separated by some optical device, such as a fiber optic cable, for example. In some embodiments, the two components are formed into a single package as shown in FIG. 2. However, it should be understood that in other embodiments the transmitter light source 122 and the receiver light source 123 may comprise separate components.

The transmitter light source 122 generates a light-encoded signal that comprises a conversion of electrical current into emitted light. The receiver light source 123 receives the light-encoded signal and converts the received light back into an electrical signal that is substantially identical to the original electrical signal at the transmitter light source 122. The opto-coupler 115 is therefore well suited for transferring digital signals.

In the embodiment shown in FIG. 2, the bus instrument 10 generates a first analog signal, which is sent to the analog-to-digital converter 240. The analog-to-digital converter 240 outputs a digital signal. The digital signal is received by the transmitter light source 122 and sent to the receiver light source 123. The receiver light source 123 can then transmit the received signal to a signal scaler 250.

The signal scaler 250 can process the digital signals, which may be in the form of a serial bit stream, for example and convert the digital signal into a scaled pulse width modulation (PWM) signal. The PWM signal can then be converted into a second analog signal and output to the bus loop 4. According to an embodiment of the invention, the signal scaler 250 is configured to scale the incoming bit stream from the receiver light source 123. The scaling may comprise any manner of linear or non-linear scaling. The scaling can occur before or during the conversion of the digital signal into the pulse width modulation signal. In other embodiments, the scaling can occur after the conversion of the digital signal into a pulse width modulation signal. This can be helpful in situations where the signal processor is receiving first analog signals that are encoded different from the encoding used by the bus loop 4. For example, in a situation where the signal processor 30 is coupled to a bus instrument 10, such as a flow meter, that sends signals based on 12-20 mA where 12 mA represents zero flow and 20 mA represents maximum flow, but the bus loop 4 comprises a two-wire bus operating on a 4-20 mA scale where 4 mA represents zero flow and 20 mA represents maximum flow. Without scaling the bit stream, the second analog signal would represent analog signals ranging from 12-20 mA. The second analog signal would represent flow in the system when in fact there is zero flow. Therefore, without scaling the bit stream, an error may be propagated throughout the system. It should be understood that the particular values used above are merely provided as an example and should not limit the scope of the invention as the particular values may vary depending on the specific implementation.

The signal scaler 250 according to an embodiment of the invention generates the pulse width modulation signal while simultaneously scaling the incoming bit stream. The signal scaler according to the present invention can scale the pulse width modulation signal based on a difference in the encoding of the signal used by the bus instrument 10 and the bus loop 4. Therefore, the scaling performed by the signal scaler 250 may comprise scaling of the pulse width modulation signal in order to accommodate the signal scale used by the host system 1. According to an embodiment of the invention, the signal scaler 250 can scale the pulse width modulation signal to accommodate a variety of bus instruments 10.

According to an embodiment of the invention, the signal scaler 250 generates a scaled PWM signal based on equations which represent a logical '0' or a logical ' 1' in the bit stream. Example equations are depicted as equation 1 and equation 2 below. It should be appreciated that equations 1 and 2 are merely examples and other equations could be utilized for generating the pulse width modulation signal without departing from the scope of the invention.

$$A = \frac{R_2 * Dig_{Per}}{V_{ref-2}} * \left( \frac{I_{2-0\%}}{1000} * \frac{1-m_2}{m_1 - m_2} - \frac{I_{2-100\%}}{1000} * \frac{1-m_1}{m_1 - m_2} \right) \quad (1)$$

$$B = \frac{R_2 * Dig_{Per}}{V_{ref-2}} * \left( \frac{I_{2-100\%}}{1000} * \frac{m_1}{m_1 - m_2} - \frac{I_{2-0\%}}{1000} * \frac{m_2}{m_1 - m_2} \right) \quad (2)$$

where:

$$m_1 = \frac{I_{1-100\%}}{1000} * \frac{R_1 * Dig_{Per}}{V_{ref-1} * Dig_{FB}} - \frac{Dig_{off-1}}{Dig_{FB-1}} \quad (3)$$

$$m_2 = \frac{I_{1-100\%}}{1000} * \frac{R_1 * Dig_{Per}}{V_{ref-1} * Dig_{FB-1}} - \frac{Dig_{off-1}}{Dig_{FB-1}} \quad (4)$$

and where the constants are:
$R_1$=first impedance
$R_2$=second impedance
$V_{ref-1}$=first reference voltage
$V_{ref-2}$=second reference voltage
$Dig_{off-1}$=first digital offset
$Dig_{per}$=periodic time
$Dig_{FB-1}$=feedback value
$I_1$=first current
$I_2$=second current It should be appreciated that equations 1 and 2 can be adjusted by changing the constants used in the equations. The constants can be changed in order to scale the pulse width modulation signal to accommodate differences between the first and second analog signal. Specifically, the constants may be changed to accommodate changes between the signal encoding of the first current and the second current. The equations are based on the physical behavior of the system. In embodiments where the host system 1 is coupled to a two-wire bus 4 operating between approximately 4-20 mA, a second current $I_2$ of approximately 4 mA corresponds to 0% while a second current value of approximately 20 mA corresponds to 100%. The first current values $I_1$ may be the same as the second, i.e., 4 mA-20 mA, or may be a different scale, for example 12 mA-20 mA. Therefore, in embodiments where the first scale and the second scale are different, the constant values can be adjusted to compensate for the difference and therefore generate a scaled pulse width modulation signal corresponding to the analog signaling used by the bus loop 4.

In addition to adjusting the constants to accommodate for differences between the first and second signaling, the constants may also be adjusted to accommodate different bus instruments. Therefore, even if the bus instrument 10 and the host system 1 utilize the same signaling, the signal scaler 250 can scale the signal to adjust the signal for differences among the sensors 13. Thus, the same signal processor 30 may be used with multiple sensors in multiple environments simply by changing the constants input into equations 1 and 2. The constants may be in the form of a look up table, stored in an internal or external storage system of the signal processor 30, or manually input by a user/operator.

Once the signal scaler 250 generates the scaled pulse width modulation signal based on the bit stream, the scaled pulse width modulation signal is converted to a second analog signal that corresponds to the analog signaling used by the host system 1. It should be appreciated that the host system 1 is not required to perform any additional scaling of the signal. Rather any required scaling of the signal is already accomplished by the signal scaler 250.

Figure 3:
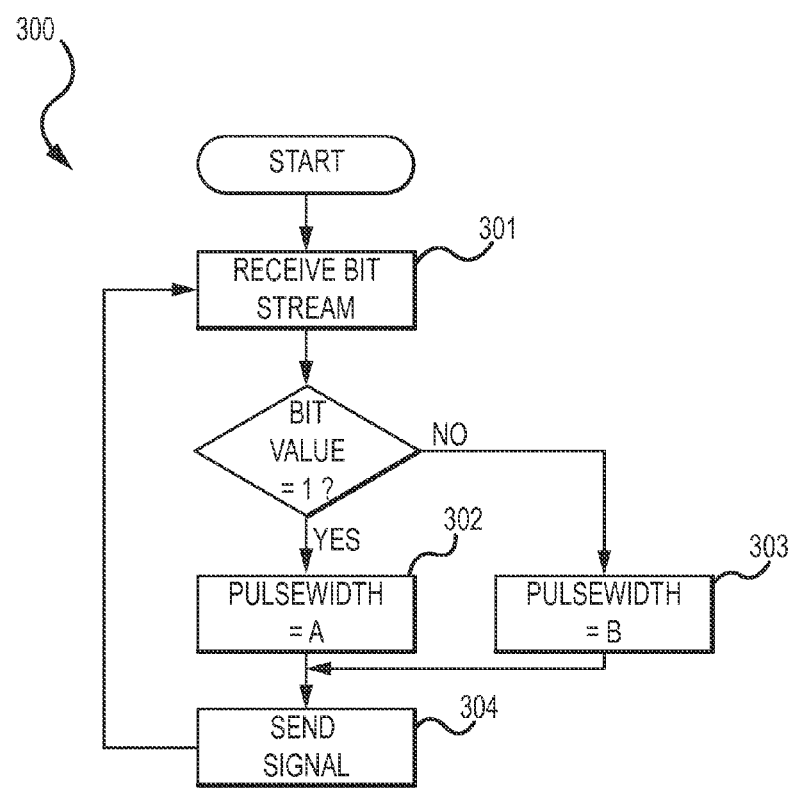
FIG. 3 shows an algorithm performed by the signal scaler according to an embodiment of the invention.

FIG. 3 shows an algorithm 300 performed by the signal scaler 250 according to an embodiment of the invention. The algorithm starts in step 301 where the bit stream is received from the optocoupler 115. If the bit stream value equals 1, the algorithm moves to step 302 where the pulse width value is calculated by adding 'A' value from equation 1 to an accumulator (not shown) of the signal scaler 250. If on the other hand, the bit stream value equals 0, the algorithm moves to step 303 where the pulse width value is calculated by adding 'B' value from equation 2 to the accumulator. Thus, the accumulator generates the pulse width modulation signal based on the number of 'A' and 'B' values in the bit stream. The scaled PWM signal can then be output in step 404. Once the signal is sent, the algorithm returns to step 301. Based on the 'A' and 'B' values, the signal scaler 250 can generate a scaled pulse width modulation signal that corresponds to the second analog signal encoding rather than the first analog signal encoding. Thus, when the signal scaler 250 converts the pulse width modulation signal into the second analog signal, the correct value is represented in the second analog signal. Therefore, even if the bus instrument 10 is operating on a 12-20 mA scale, the pulse width modulation signal generated corresponds to the 4-20 mA scale used by the host system 1 and the bus loop 4. The scaling substantially prevents an error from occurring due to a difference in signaling between the bus instrument 10 and the host system 1.

Figure 4:
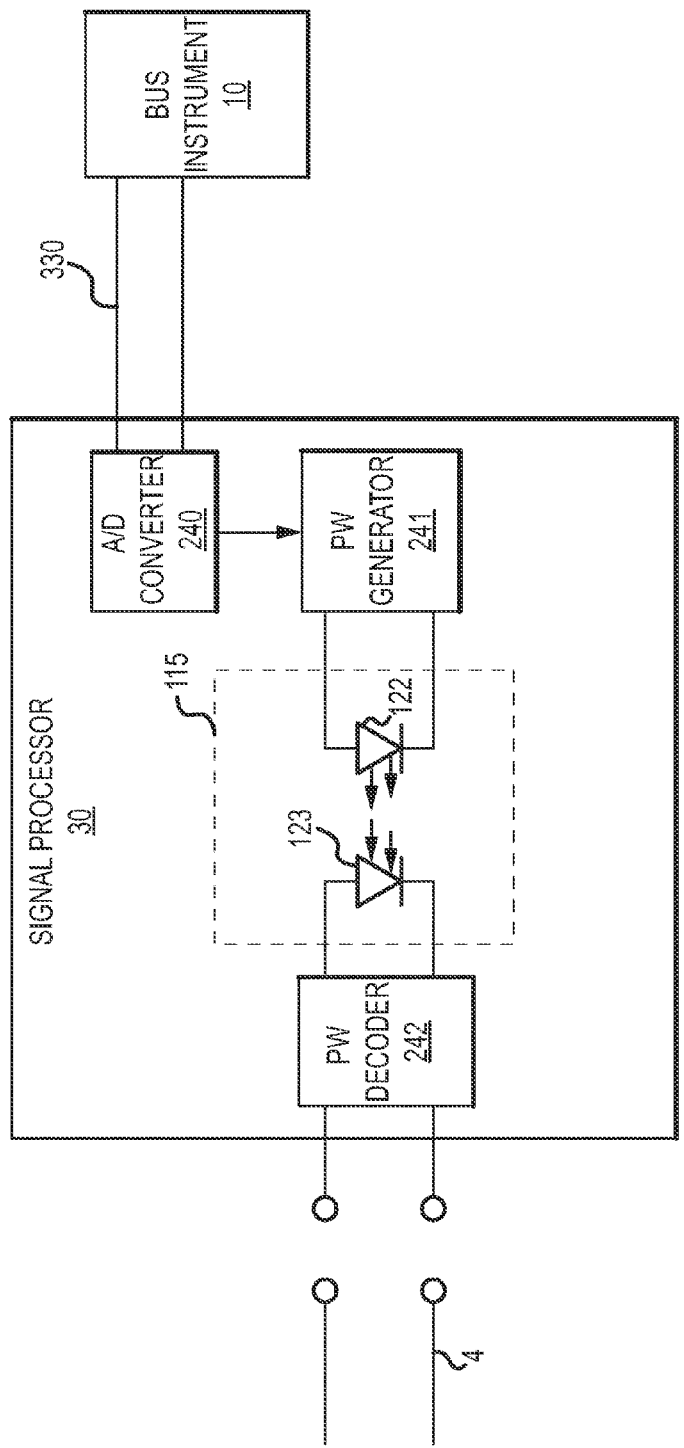
FIG. 4 shows the signal processor according to another embodiment of the invention.

FIG. 4 shows the signal processor 30 according to another embodiment of the invention. The signal processor 30 shown in FIG. 4 is configured to receive a first analog signal, convert the analog signal to a digital representation, generate a PWM signal based on the digital signal, transmit the PWM signal through the optocoupler, scale the PWM signal using a PWM decoder 442, and convert the scaled signal back into a second analog signal, wherein the first and second analog signal may or may not comprise the same value. In addition to the components shown in FIG. 2, the signal processor 30 of FIG. 5 also includes a pulse width generator 241 and a pulse width decoder 242. According to an embodiment of the invention, the pulse width generator 241 generates a PWM signal based on the serial bit stream received from the analog-to-digital converter 240. The PWM signal can then be transmitted via the optocoupler 115. According to an embodiment of the invention, the pulse width decoder 242 scales the PWM signal received from the receiver light source 123 into a signal useable by the bus loop 4. The scaled PWM signal can then be converted into a second analog signal and output to the bus loop 4. This is in contrast to the signal processor shown in FIG. 2, which scales the signal while generating the PWM signal. Therefore, the signal processor 30 of FIG. 4 requires an additional step by requiring the pulse width decoder 242 to scale the PWM signal. It should be appreciated however, that overall, the signal processor 30 of FIG. 4 is still capable of scaling a signal prior to outputting it to the bus loop 4. Therefore, the bus instrument 10 and the host system 1 may still operate using different signaling or different scales.

According to another embodiment of the invention, the Pulse width generator 241 scales the PWM signal as described above prior to sending the signal to the optocoupler 115. Therefore, the pulse width decoder 242 only needs to convert the scaled PWM signal into a second analog signal prior to outputting the signal to the bus loop 4.

Although the above description has described the signal processor 30 as comprising a component separate from the bus instrument 10, it should be understood that in some embodiments, the signal processor 30 comprises an integral component of the bus instrument 10. Therefore, according to an embodiment of the invention, the bus instrument electronics 20 can generate a scaled PWM signal and convert the scaled PWM signal into a second analog signal prior to outputting a signal. Furthermore, although the above description has discussed the signal processor 30 in combination with a bus instrument 10, it should be appreciated that the scaling that occurs within the signal processor 30 is equally applicable to any input analog signal. Furthermore, the signal processor 30 does not need to be connected to a bus loop 4. The discussion of the invention in relation to those components is merely for the purpose of aiding in the understanding of the invention and should in no way limit the scope of the invention.

The claimed invention as described above provides a signal processing system 100 capable of transmitting a signal between two or more loop systems that may be operating under different encoding schemes. The signal processing system 100 is configured to scale the input digital signal into a signal that corresponds to the encoding scheme of the second analog signal rather than the first analog signal. Thus, the delivered digital signal can be converted back into an analog signal without further processing.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other bus loop electronics, and not just to the embodiments described above and shown in the accompanying figures. Accordingly, the scope of the invention should be determined from the following claims.

We claim:

1. A signal processor (30) configured to:
   receive a first analog signal;
   convert the first analog signal into a digital signal;
   transmit the digital signal across an electrical barrier;
   generate a pulse width modulation signal based on the digital signal;
   scale the pulse width modulation signal based on a difference between a first analog signal encoding and a second analog signal encoding; and
   convert the scaled pulse width modulation signal into a second analog signal.

2. The signal processor (30) of claim 1, wherein the electrical barrier comprises an optocoupler (115).

3. The signal processor (30) of claim 1, wherein the first analog signal encoding is utilized by a bus instrument (10) coupled to an input of the signal processor (30) and the second analog signal encoding is utilized by a bus loop (4) coupled to an output of the signal processor (30).

4. The signal processor (30) of claim 1, wherein the digital signal comprises a serial bit stream.

5. The signal processor (30) of claim 1, further comprising:
   an analog-to-digital converter (240) adapted to convert the first analog signal received by a bus instrument (10) electrically isolated from a bus loop (4) by the signal processor (30) into the digital signal; and
   a signal transmitter (115) adapted to transmit the digital signal to a signal scaler (250);
   wherein the signal scaler (250) is adapted to convert the digital signal into a scaled pulse width modulation signal and convert the scaled pulse width modulation signal into a scaled second analog signal.

6. The signal processor (30) of claim 1, wherein the signal transmitter (115) comprises an optocoupler adapted to electrically isolate the bus instrument (10) from the bus loop (4).

7. The signal processor (30) of claim 1, wherein a first analog signal encoding is different from a second analog signal encoding.

8. A signal processor (30), configured to:
receive a first analog signal;
convert the first analog signal into a digital signal;
generate a pulse width modulation signal based on the digital signal;
transmit the pulse width modulation signal across an electrical barrier; and
convert the pulse width modulation signal into a scaled second analog signal based on a difference between a first analog signal encoding and a second analog signal encoding.

9. The signal processor (30) of claim 8, wherein the first analog signal encoding is utilized by a bus instrument (10) coupled to an input of the signal processor (30) and the second analog signal encoding is utilized by a bus loop (4) coupled to an output of the signal processor (30).

10. A method for transmitting signals from an analog signal generator to an analog signal receiver, comprising steps of:
generating a first analog signal;
converting the first analog signal into a digital signal;
transmitting the digital signal across an electrical barrier;
generating a pulse width modulation signal based on the digital signals;
scaling the pulse width modulation signal based on a difference between a first analog signal encoding and a second analog signal encoding; and
converting the scaled pulse width modulation signal into a scaled second analog signal.

11. The method of claim 10, further comprising using an optocoupler to transmit the digital signal.

12. The method of claim 10, wherein the scaled second analog signal is based on a difference between the first analog signal encoding utilized by the analog signal generator and the second analog signal encoding utilized by the analog signal receiver.

13. A method for transmitting signals from an analog signal generator to an analog signal receiver, comprising steps of:
receiving a first analog signal;
converting the first analog signal into a digital signal;
generating a pulse width modulation signal based on the digital signal;
transmitting the pulse width modulation signal across an electrical barrier; and
converting the pulse width modulation signal into a scaled second analog signal based on a difference between a first analog signal encoding and a second analog signal encoding.

14. The method of claim 13, further comprising using an optocoupler to transmit the digital signal.

15. The method of claim 13, wherein the scaled second analog signal is based on a difference between the first analog signal encoding utilized by the analog signal generator and the second analog signal encoding utilized by the analog signal receiver.

* * * * *